(12) United States Patent
Aymard et al.

(10) Patent No.: US 10,278,400 B2
(45) Date of Patent: May 7, 2019

(54) BISCUIT FILLING

(71) Applicant: Generale Biscuit, Clamart (FR)

(72) Inventors: Pierre Aymard, Saclay (FR); Robin Wahl, Saclay (FR)

(73) Assignee: Generale Biscuit, Clamart (FR)

( * ) Notice: Subject to any disclaimer, the term of this patent is extended or adjusted under 35 U.S.C. 154(b) by 132 days.

(21) Appl. No.: 15/103,286

(22) PCT Filed: Dec. 4, 2014

(86) PCT No.: PCT/EP2014/076623
§ 371 (c)(1),
(2) Date: Jun. 9, 2016

(87) PCT Pub. No.: WO2015/091007
PCT Pub. Date: Jun. 25, 2015

(65) Prior Publication Data
US 2016/0302427 A1    Oct. 20, 2016

(30) Foreign Application Priority Data

Dec. 20, 2013  (EP) .................................. 13199242

(51) Int. Cl.
*A21D 13/38*   (2017.01)
*A23C 9/123*   (2006.01)
(Continued)

(52) U.S. Cl.
CPC .............. *A21D 13/38* (2017.01); *A21D 13/32* (2017.01); *A23C 9/123* (2013.01); *A23C 9/137* (2013.01);
(Continued)

(58) Field of Classification Search
CPC ........ A21D 13/38; A21D 13/32; A23C 9/123; A23L 33/135
See application file for complete search history.

(56) References Cited

U.S. PATENT DOCUMENTS

| 4,396,631 A | 8/1983 | Adachi |
| 2008/0305210 A1 | 12/2008 | Petersen |

(Continued)

FOREIGN PATENT DOCUMENTS

| CA | 2839579 A1 * | 9/2012 | ............. A21D 13/02 |
| CN | 101427741 A | 5/2009 | |

(Continued)

OTHER PUBLICATIONS

International Search Report dated Feb. 5, 2015 for International Application No. PCT/EP2014/076623 (4 pgs.).

(Continued)

*Primary Examiner* — Jenna A Watts
(74) *Attorney, Agent, or Firm* — Fitch, Even, Tabin & Flannery LLP

(57) ABSTRACT

The present disclosure relates to a method for producing a composite biscuit product, the method comprising: forming a filling comprising a yoghurt powder and from 10 to 30 wt % of dry starch, based on the total weight of the filling, wherein the filling has an Aw of from 0.05 to 0.25 and contains live lactic cultures having a cell count of at least $10^7$ cfu/g; contacting the filling with one or more biscuit parts to form a composite biscuit product.

19 Claims, 1 Drawing Sheet

(51) Int. Cl.

| | | |
|---|---|---|
| A23C 9/137 | (2006.01) | |
| A23P 20/20 | (2016.01) | |
| A23L 33/135 | (2016.01) | |
| A23L 33/20 | (2016.01) | |
| A21D 13/32 | (2017.01) | |

(52) U.S. Cl.
CPC ............. *A23L 33/135* (2016.08); *A23L 33/20* (2016.08); *A23P 20/20* (2016.08)

(56) References Cited

U.S. PATENT DOCUMENTS

| | | |
|---|---|---|
| 2009/0304864 A1 | 12/2009 | Marchal et al. |
| 2010/0136182 A1 | 6/2010 | Rabault et al. |

FOREIGN PATENT DOCUMENTS

| | | |
|---|---|---|
| CN | 101518306 A | 9/2009 |
| CN | 102972489 A | 3/2013 |
| CN | 103189499 A | 7/2013 |
| EP | 0372596 A2 | 6/1990 |
| EP | 11290279.6 | 6/2011 |
| EP | 2671453 A1 | 12/2013 |
| FR | 2895877 A1 | 7/2007 |
| WO | 9909839 A1 | 3/1999 |
| WO | 2006007463 A1 | 1/2006 |
| WO | 2006064959 A1 | 6/2006 |
| WO | 2007017593 A1 | 2/2007 |
| WO | 2012152650 A1 | 11/2012 |

OTHER PUBLICATIONS

Written Opinion of the International Searching Authority for International Application No. PCT/EP2014/076623 (7 pgs.).

European Search Report and Opinion dated Feb. 28, 2014, for Application No. EP13199242.2.

Amendments dated Dec. 16, 2015 in Response to the Communication pursuant to Rule 69 EPC, dated Jun. 29, 2015, for Application No. EP13199242.2 (15 pgs.).

Castro, H. P.; Teixeira, P. M.; Kirby, R. Storage of Lyophilized Cultures of Lactobacillus bulgaricus under different relative humidities and atmospheres (5 pgs.).

Codex Standard for Fermented Milks, Codes Stan 243-2003, Adopted in 2003 Revision 2008, 2010 (11 pgs.).

International application No. PCT/EP2012/061887 (36 pgs.).

Englyst, Klaus N., et al., Glycaemk index of cereal products explained by their content of rapidly and slowly available glucose, British Journal of Nutrition (2003), 89, 329-339, Danone Vitapole 2003 (12 pgs.).

Englyst, Hans N., et al., Measurement of rapidly available glucose (RAG) in plant foods: a potential in vitro predictor of the glycaemic response, British Journal of Nutrition (1996) 75, 327-337 (11 pgs.).

Englyst, Klaus N., et al., Rapidly available glucose in foods: an in vitro measurement that reflects the glycemic response, The American Journal of Clinical Nutrition, Downloaded from ajcn.nutrition.org by guest on Apr. 6, 2016 (7 pgs.).

Teixeira, P. C., et al., Survival of *Lactobacillus delbrueckii* ssp. *bulgarlcus* Following Spray-Drying, Journal of Dairy Science vol. 78, No. 5, 1995 (7 pgs.).

Thomas Scientific, XP-002720998 (2 pgs.)

Yogurt—Enumeration of characteristic microorganisms—Colony-count technique at 37° C., International Standard, First Edition, ISO and IDF 2003 (17 pgs.).

Chinese Office Action and Search Report dated Jun. 12, 2017, for Chinese Application No. 201480065442.2, with English Translation (18 pgs.).

\* cited by examiner

BISCUIT FILLING

CROSS REFERENCE TO RELATED APPLICATIONS

This application is a U.S. national phase application of International Application No. PCT/EP2014/076623, filed Dec. 4, 2014, which claims benefit from European Application 13199242.2, filed Dec. 20, 2013, which are each hereby incorporated herein by reference in their entirety.

FIELD

The present disclosure relates to fillings for biscuit products. In particular, the disclosure relates to such fillings containing live cultures, especially yoghurt, which can be provided with an improved shelf life and stability.

BACKGROUND

It is known to make food products comprising a biscuit part and a filling part. For example, products having two biscuits and a filling therebetween are known as sandwich biscuits. It is also known for these food products to include in the filling-part an anhydrous filling with live lactic cultures. Anhydrous fillings comprising live lactic cultures are usually produced with yoghurt.

Yoghurt is the product of milk fermentation by symbiotic cultures of *Streptococcus thermophilus* and *Lactobacillus delbrueckii* subspecies *bulgaricus*. Yoghurt is known to have beneficial properties, such as facilitating lactose digestion. These beneficial properties arise from the presence of the two strains of bacteria in large quantities: in particular, the yoghurt has a total cell count of the population of both strains of over $10^7$ cfu/g (cfu: colony-forming unit). However, the shelf-life of yoghurt is usually short; usually less than 2 months for fresh yoghurt. Therefore, yoghurt is usually kept at a low temperature to limit decay of the lactic cultures and organoleptic deterioration.

It is known to make yoghurt powders since they have a longer shelf-life with respect to the organoleptic properties. They are obtained via various drying methods such as freeze-drying and spray-drying. For economic reasons, spray drying is more commonly used. However, spray-drying is more detrimental to lactic culture survival than freeze-drying during production and, thus, results in a greater loss of lactic cultures during drying. Consequently, most of the commercially available yoghurt powders only contain limited amounts of live lactic cultures; lower than $10^7$ cfu/g of yoghurt powder. These are, moreover, typically not sufficiently viable during storage.

US2010136182 discloses a fat-based filling containing starch.

EP2671453 discloses a food product having a filling with a high amount of live lactic cultures.

US2008/305210 discloses cultures encapsulated with compound fat, as well as breakfast cereals coated with the same.

US2009/304864 discloses a powder of fermented milk or yoghurt with a high density of lactic ferments.

WO99/09839 discloses a paste-like composition for use as a filling containing a significant amount of probiotic.

WO2006064959 discloses a lactic acid bacteria-containing chewing gum tablet.

FR2895877 provides a method for producing yoghurt powder with high amount of live lactic cultures, i.e. higher than $5 \times 10^8$ cfu/g of yoghurt powder. This yoghurt powder can be used in fillings for producing sandwich biscuits with a high cell count. The cell count remains high enough to be compliant with the regulatory requirements for yoghurts for up to 7 months at room temperature. However, the products are insufficiently stable to have a shelf-life of 9 months, or even 12 months, which is typical for filled biscuits. In addition, in warmer climates where the sandwich biscuits may be exposed to temperatures above 30° C. for significant periods of time, the shelf stability is unlikely to be sufficient. There is therefore a need to improve the shelf-stability of the composite product.

SUMMARY

Therefore, one aim is to provide a food product comprising a biscuit part and a filling part, the filling part of which comprises live lactic cultures and starch, as a source of slowly digestible starch (SDS), that tackles the drawbacks associated with the prior art, or at least provides a commercial alternative thereto.

According to a first aspect, there is provided a method for producing a composite biscuit product, the method comprising:

forming a filling comprising a powder containing live lactic cultures, and from 10 to 30 wt % of dry starch based on the total weight of the filling, wherein the filling has an Aw of from 0.05 to 0.25 and wherein the live lactic cultures have a cell count of at least $10^7$ cfu/g;

contacting the filling with one or more biscuit parts to form a composite biscuit product.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. In particular, aspects described with relation to the method can be applied equally to the composite biscuit product and vice versa.

The present inventors have found a method for producing a composite biscuit product containing beneficial live lactic cultures and having an improved shelf-stability. That is, the retail life of the product is extended because the live cultures have a greater longevity and maintain a high level of live cultures under long periods of ambient storage.

By the term "biscuit", it is meant any baked cereal products, with a low moisture content (less than 5%) and a crispy texture, made from a dough or a batter, that includes the commonly known biscuits, cookies, crackers, wafers, and baked granola bars, preferably biscuits, cookies, crackers and wafers.

By the term "composite biscuit", it is meant a biscuit product having one or more separate biscuit portions and a filling. The product may optionally further comprise a coating. The filling may be provided within a biscuit product, between two or more biscuit products or as an overlying coating layer around at least an outer portion of a biscuit. That is, when there is only one biscuit, the filling part can be deposited wholly onto one surface thereof or partially on each surface. The filling part can also be deposited inside the biscuit. When there are two or more biscuits, the filling part may be layered between two biscuits to form a so-called sandwich biscuit.

The filing is preferably a fat-based filing. Such fillings are discussed in US2010136182, which is incorporated herein by reference. A fat-based filling is one containing a continuous fat phase with a suspension of solid particles of other ingredients. Accordingly, the actual amount of fat present in the filling can be relatively low, provided that a suspension is formed. A method for forming a fat-based filling comprising a yoghurt powder is disclosed in US2010136182. The filing is preferably a so-called anhydrous filing.

The water activity (Aw) of a product is a notion which is well known in the food industry field. This value measures the availability of water in a sample. In most cases, this water activity is not proportional to the water content of the product. Methods for measuring Aw of a product are known to the person skilled in the art. For example, it can be measured with an Aqualab CX-2 or series 3, or a Novasina. All Aw values indicated hereafter are measured at 25±0.1° C.

"Lactic culture" means any bacteria suitable for producing fermented food product yielding lactic acid. These bacteria are chosen amidst the genus of *Lactobacillus, Lactococcus, Streptococcus* and *Bifidobacteria*. Examples of *Lactobacillus* are *L. acidophilus, L. delbrueckii, L. kefiri, L. helveticus, L. salivarius, L. casei, L. curvatus, L. plantarum, L. sakei, L. brevis, L. buchneri, L. fermentum* and *L. reuteri*. One example of *Lactococcus* is *L. lactis*. One example of *Streptococcus* is *S. thermophilus*. Examples of *Bifidobacteria* are *B. bifidum, B. longum* and *B. infantis*.

The powder included in the filling preferably comprises *Streptococcus thermophilus* and *Lactobacillus bulgaricus*, which are present in yoghurt. Preferably the live cultures in the filling consist of *Streptococcus thermophilus* and *Lactobacillus bulgaricus*, and can therefore be described as yoghurt under standard regulatory requirements. The powder in the filling may be referred to herein as a yoghurt powder, but the use of powders including other lactic cultures is also contemplated, in particular, powders derived from fermented dairy products. The most preferred powered is a yoghurt powder.

Advantageously, the filling comprises from 10 to 30 wt % of dry starch, based on the total weight of the filling. The starch is preferably native, which means that the natural pseudo-crystalline structure of starch existing in the plant is preserved. In particular, this means that the starch is present as granules. This acts as a bulking agent, to replace sugar in the mixture, while also keeping the viscosity low and thereby reducing the amount of fat required. Preferably the filling comprises from 15 to 25 wt % of dry starch, preferably about 20 wt %, based on the total weight of the filling. Native dry starch also provides slowly digestible starch, which, combined with that present in the biscuit, contributes to lower down the glycaemic response of the composite biscuit product.

Preferably the filling contains at least 5 g of slowly digestible starch (SDS) per 100 g of filling, more preferably at least 10 g. The SDS helps to provide a long lasting energy source. The SDS in the filling is provided by the starch.

The starch is dried to a low moisture content. Typically starch has a water content of as low as about 12 wt %. The dry starch employed in the present invention has a water content of less than 8 wt %. Preferably the starch has a moisture content of less than 6 wt %, more preferably from 3 to 5 wt %.

The yoghurt powder contains live lactic cultures having a cell count of at least $10^7$ cfu/g. Preferably the live lactic cultures have a cell count of at least $10^8$ cfu/g, preferably at least $10^9$ cfu/g. Typically the cell count will not exceed $10^{11}$ cfu/g. Techniques for measuring the cell count are well known in the art. This level of the cell count is a regulatory requirement for the wording "yoghurt" in the Countries having adopted the CODEX STAN 243-2003 definition.

In the case of yoghurt, the live lactic cultures comprise *Lactobacillus delbrueckii* sub-species *bulgaricus* and *Streptococcus thermophilus*. It has been found that *Lactobacillus bulgaricus* is more sensitive to the drying processes involved in forming the powder. Accordingly, the preferred blend will typically contain more *Streptococcus thermophilus* than *Lactobacillus bulgaricus*.

The filling has an Aw of from 0.05 to 0.25. Preferably the filling has an Aw from 0.08 to 0.2, more preferably from 0.1 to 0.18, and most preferably of about 0.15. By comparison, the same filling containing the same amount of standard starch has an Aw of about 0.35.

The biscuit part preferably has a water activity value lower than 0.15, preferably lower than 0.10, more preferably lower than 0.07. Preferably the biscuit part has a water activity value of from 0.03 to 0.06.

The overall Aw value of the food product is preferably lower than 0.2, preferably lower than 0.15, more preferably lower than 0.1. The provision of such low Aw has been found to allow for a surprisingly high shelf stability and the maintenance of the yoghurt cultures. In particular, an Aw as low of 0.08 has surprisingly been found to permit long shelf life with stable cultures of at least 6 months, even up to 9 or 12 months.

The filling preferably comprises less than 30 wt % fat, preferably from 20 to 30 wt % fat. The filling preferably comprises less than 50 wt % sugars, preferably 40 to 50 wt % sugars. By sugars it is meant added sugar, as well as sugars present in the yoghurt powder (which may contain 55 wt % lactose). These amounts allow for the provision of a healthy final product and do not compromise the longevity of the live cultures.

The method further comprises contacting the filling with one or more biscuit parts to form a composite biscuit product. The step of contacting may comprise any known technique for applying filling to a biscuit, including layering techniques and low shear extrusion processes, for example.

Once the composite biscuit has been formed it will be packaged, preferably in a substantially air-tight container. The biscuit may be packaged individually or in packs containing a plurality of biscuits.

Preferably the filling comprises the powder (preferably yoghurt powder) in an amount of from 3 to 15 wt %, based on the total weight of the filling. More preferably, the filling comprises the powder in an amount of about 11 wt %. This provides a balance of the organoleptic properties, the flavouring and the nutrition (calcium, protein and desired amount of live cultures).

Preferably the composite biscuit product has a shelf stability when packaged and then stored at 20° C. of at least 6 months. More preferably the composite biscuit product has a shelf stability when stored at 20° C. of at least 8 months, most preferably at least 10 months. That is, the total cell count does not fall beyond the threshold of $10^7$ cfu/g of lactic portion specified by CODEX STAN 243-2003.

Preferably the filling is formed at a temperature of from 37° C. to 46° C., more preferably from 39 to 43° C. Higher temperatures are preferred because they allow for easier handling, mixing and extrusion of the mixture. However, the higher temperatures typically lead to a faster loss of the live cultures. Surprisingly, however, it has been found that the use of dry starch as described herein, increases the tolerance of the cultures to the heat of mixing required to form the filling. Accordingly, higher temperatures can be used when the dry starch is present. More generally, the fat-based filling is preferably heated to a temperature at which its viscosity reaches down to at most 13.5 Pa·s (measured at a shear rate of 2 s$^{-1}$).

In one embodiment, the composite biscuit product further comprises a separate water-based filling. Such water based fillings would have a water activity of from 0.2 to 0.4. For clarity, the filling discussed above will be referred to below as a fat-based filling to distinguish over the water-based filling.

A preferred water-based filling is a fruit-based filling. That is, a filling containing a fruit component, such as a jam. Such a fruit-based filling will have a higher Aw than the fat-based filling and may affect the shelf-stability of the live cultures. Accordingly, it is preferred that the fat-based filling and the fruit-based filling are kept substantially separate and distinct. By "distinct" it is meant that the fruit-based filling and the anhydrous filling have different compositions and can be differentiated in the final food product, either visually or organoleptically. Preferably the fruit-based filling and the fat-based filling are physically distinct. That is, although they may be in contact, they form separate layers or structures within the food product. For example, the two fillings may form separate lines, perhaps lying parallel to each other between two biscuit portions.

The term "fruit" is here intended to mean any "natural" fruit excluding the dry fruits commonly called "nuts" (such as walnuts, hazelnuts, almonds, peanuts, cashew nut, pecan nut). Advantageously, the fruit is orchard fruit, more advantageously chosen in the group consisting of red fruit such as strawberries, raspberries, blueberries, blackcurrant, redcurrant, cranberry, elderberries or blackberries, exotic fruit such as pineapple, mango, passion fruit, pomegranate, litchi or kiwi, melon, peach, apricot, banana, cherries, apples, pears, citrus fruit such as orange, lemon, grapefruit, citrus or clementine, grapes, plums, cherry, Mirabelle, figs, raisin, tomato, carrot, red bell pepper, pumpkin, dates, and mixture thereof, still more advantageously chosen in the group consisting of cranberry, apricot, apple, raspberry, strawberry, raisin, peach, fig, dates, cherries, plums, tomato and mixture thereof, more advantageously chosen in the group consisting of cranberry, apricot, apple, raspberry, strawberry, raisin, fig and mixture thereof. By extension, Rhubarb is also included in the term "fruit", even though it is not a botanical fruit, since it is usually classified and used as a fruit in cooking.

The fruit contained in the water-based filling can contain soft fruit particles, in which case, the maximum size of the soft fruit particles is 4 mm.

The water-based filling may contain cooked fruit such as jam. Alternatively, the water-based filling may contain fresh or preserved fruit.

Other water-based filings include those which do not contain fruit, such as caramel fillings.

The composite biscuit product may additionally contain a further fat-based filling, such as a chocolate filling. Such filling are known in the art.

According to a further aspect there is provided a composite biscuit product obtainable by the method described herein.

According to another aspect, there is provided a composite biscuit product comprising a biscuit part and a filling, wherein the filling comprises a powder, preferably a yoghurt powder, containing live lactic cultures having a cell count of at least 10$^7$ cfu/g, and from 10 to 30 wt % of dry starch based on the total weight of the filling, wherein the filling has an Aw of from 0.05 to 0.25. Preferably the composite biscuit product has a water activity of from 0.03 to 0.2, preferably less than 0.1 and most preferably between 0.05 to 0.1. It should be appreciated that the aspects of the method described herein apply equally to the aspect of the composite biscuit product.

As will be appreciated, the filling described herein is characterised, in part, by the lactic cultures cell count. This is measured when the composite biscuit product is first formed and packaged. Advantageously, the total amount of live yoghurt cultures has a very low decay rate, of at most 0.25 log$_{10}$ cfu/g per month.

The biscuit part may also contain inclusions, i.e. small pieces of edible particles with a size lower than 4 mm. Inclusions may be chocolate drops, nuts like hazelnut (preferably hazelnut pieces), extruded cereal, etc. Inclusions do not include whole or minced cereal particles, such as grits or flakes. Inclusions bring texture and flavour without increasing slowly available glucose (SAG) content.

Chocolate drops are pieces of solid chocolate. "Chocolate" is understood as meaning either "dark chocolate", "milk chocolate" or "white chocolate". Preferably, chocolate drops are dark chocolate pieces containing at least 35 wt. % of cocoa liquor (US legislation), more preferably 35 wt. % of cocoa solids (European Union legislation), still more preferably at least 40 wt. %.

In the composite product, the proportion of energy (calories) coming from the carbohydrates is over 55%, preferably over 59%, more preferably at least 60%.

The composite biscuit product has a slowly-digestible-starch (SDS) content of at least 10 g/100 g food product, preferably over 12 g/100 g and more preferably at least 15 g/100 g.

The composite biscuit product preferably has a slowly-digestible-starch-over-total-available-starch ratio (SDS/(SDS+RDS)) of at least 31 wt. %, preferably at least 35 wt. %, more preferably at least 38 wt. %, still more preferably at least 40 wt. %. Total available starch comprises slowly digestible starch (SDS) and rapidly digestible starch (RDS). The difference between total available starch and total starch is that total available starch does not comprise resistant starch that cannot be digested, i.e. that escapes digestion in the small intestine.

Consumption of slowly digestible starch in place of rapidly digestible starch is believed to be beneficial for health. Indeed, rapidly digestible starch is rapidly broken down into glucose during digestion and thus rapidly made available to the body. Therefore, the fast appearance of glucose (peak) from biscuits in the blood leads to a higher glycaemic response. On the contrary, slowly digestible starch is slowly assimilated by the body due to an appearance of glucose from food products that is slower and maintained over time, thus providing long-lasting energy.

SDS or slowly available glucose (SAG) can be characterised through the slowly available glucose (SAG) measurement by Englyst method ("Rapidly Available Glucose in Foods: an In Vitro Measurement that Reflects the Glycaemic Response", Englyst et al., Am. J. Clin. Nutr., 1999 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337). SAG refers to the amount of glucose (from sugar and starch, including maltodextrins) likely to be available for slow absorption in the human small intestine. In the present case, the SDS content equals the SAG content since there is no other SAG source than starch, i.e. SDS. Rapidly available glucose (RAG) refers to the amount of glucose likely to be available for rapid absorption in the human small intestine. RAG content is composed by the rapidly digestible starch and the glucose units provided by sugars included in the recipe. In Englyst method, samples are prepared by manually and roughly grinding one or more biscuits or sandwiches. The samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labelled RAG. After an enzymatic digestion time of 120 min, glucose is again measured and is labelled available glucose (AG). SAG is obtained by subtracting RAG to AG (SAG=AG−RAG), thus, SAG corresponds to the glucose fraction released between the 20th and the 120th minute. Free glucose (FG), including the glucose released from sucrose, is obtained by separate analysis. RDS is then obtained as the subtraction of FG from RAG (RDS=RAG−FG).

Advantageously, the composite biscuit product has at least 15 g SDS/100 g food product. This composite biscuit product particularly complies to long-lasting energy criteria, i.e. SDS value over 15 g/100 g biscuit or slowly-digestible-starch-over-total-available-starch ratio of at least 31% with respect to the total weight of the food product.

The method described herein has been found to provide a number of unexpected benefits. In particular, because of the improved shelf stability, the risk of providing a product which is non-compliant with the regulations defining yoghurt is reduced. In addition, the longer shelf-life provides cost savings.

It is known that dried yoghurt cultures are sensitive to moisture. In order to maintain a high survival rate, it is common in the art to disperse or encapsulate live cultures in excess fat. However, this is a problem when trying to provide a healthy and low-fat biscuit product, because of the nutritional constraints on fat and sugar content. Furthermore, while trying to provide a filling with a high amount of starch as sugar replacer and providing the high levels of SDS, it is difficult to maintain the high survival rate. For example, a typical known filling that achieves the healthy parameters might contain 28% w/w added fat and 20% w/w native wheat starch in the filling, together with the live yoghurt cultures.

Advantageously, the claimed solution helps to keep the cultures alive while coping with these constraints on the filling. In addition, the use of the dry starch (less than 5 wt % moisture) leads to a decrease in the filling viscosity and, additionally allows for higher temperature processing, both of which make construction of the composite biscuit faster and simpler. Alternatively, the lower viscosity can allow for lower temperature filing, which leads to an improved initial level of the lactic cultures in the composite product.

The use of the dried starch ingredient also leads to an increase in the culture survivability. This is despite the presence of the drier biscuit component and the expectation that such low Aw values for the composite biscuit might lead to a lower survivability. Indeed, the inventors found that the Aw of the composite product could be as low as 0.06+/−0.02 and yet provide an unexpected increase in the culture survivability.

As discussed above, the method described herein may comprise the steps, as shown in FIG. 1, as follows.

(a) forming a filling as described herein;
(b) depositing the filling onto a first biscuit part;
(c) optionally, providing a second biscuit forming another portion of the biscuit part on top of the filling part;
(d) optionally cooling the food product down to 23° C. or lower, preferably higher than 10° C. before packaging.

BRIEF DESCRIPTION OF THE FIGURES

The present disclosure will be described in relation to the following non-limiting figures, in which.

EXAMPLES

Figure 1:
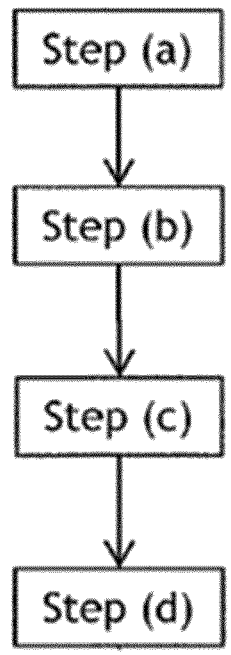
FIG. 1 is a flowchart illustrating the different steps of one embodiment of the method for producing a food product as described here above.
Figure 2:
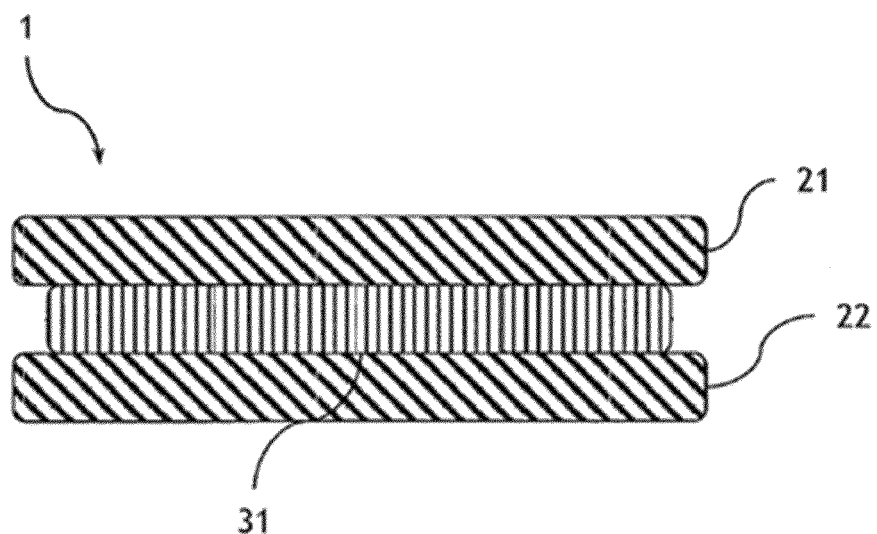
FIG. 2 schematically shows one embodiment of a composite biscuit product 1 as described above in a sandwich biscuit form comprising a biscuit part and a filling part. The biscuit part comprises two biscuits 21, 22 between which lies the filling part 31.

The present disclosure will now be described in relation to the following non-limiting examples.

Cell Count Measurement

The cell count of the two cultures typically found in yoghurt (*S. thermophilus* and *L. bulgaricus*, see CODEX ALIMENTARIUS) was measured according to the official standard method for enumerating lactic bacteria (ISO 7889, "Yoghurt: Enumeration of characteristic micro-organisms. A colony-count technique at 37° C."). Cell count was measured at different times during shelf-life (several months at room temperature) and the decay rate was measured according to Equation 1:

$$\text{Decay rate} = \frac{\log_{10}(C_0) - \log_{10}(C_f)}{\text{Storage time}}, \quad \text{(Eq. 1)}$$

Where $\log_{10}(C_0)$ is the initial $\log_{10}$ cell count and $\log_{10}(C_f)$ the final $\log_{10}$ cell count. Storage time is expressed in month, so that decay rate is expressed in $\log_{10}(\text{CFU}) \cdot \text{month}^{-1}$.

In practice, $\log_{10}(c)$ is plotted vs time for each culture and the decay rate is the slope of the linear regression.

Viscosity Measurement of the Filling

The rheological behaviour of the filling was measured using a high performance rheometer MCR300 (Anton Paar Physica) interfaced with a PC. Viscosity was measured using coaxial cylinders geometry (TEZ 150PC and CC27) at different temperatures and at a shear rate of 2 $s^{-1}$.

Example 1

Improvement of the Survival Rates at Room Temperature During Shelf-Life with Dry Starch (Vs Standard Wheat Starch)

Example 1 shows how the replacement of native wheat starch with 12% moisture by a dry starch with 5% moisture allows a significant increase in live cultures survival over the shelf-life at room temperature.

A yoghurt cream was produced with the ingredients of table 1. Fat is first melted and incorporated in the mixer at a temperature of about 50-55° C. Then, all powders except yoghurt powder are dispersed under high shear in the melted fat. When added to the melted fat, the powders are at room temperature, so that their incorporation into the melted fat drops the temperature down to between 38° C. and 45° C. The resulting mixture is then further mixed during 5 to 10 minutes at high speed for obtaining a homogeneous mixture with a relatively fluid consistency. Yoghurt powder is then added to this mixture under shear and the whole is mixed for 2 to 5 minutes resulting in a yoghurt filling (cream) with a viscosity of about 14 Pa·s. The yoghurt filling is then transferred from the mixer into a double jacketed buffer tank kept at 40±0.5° C. with mild stirring.

TABLE 1

| Ingredients | Filling 1 | Filling 2 |
|---|---|---|
| Fat | 27.5 | 27.5 |
| Sugars | 36.0 | 36.0 |
| Starch 12% moisture | 20.0 | — |
| Starch 5% moisture | — | 20.0 |
| Yoghurt powder | 11.0 | 11.0 |
| Sweet whey powder | 5.0 | 5.0 |
| Others (texturing agents, flavours, etc.) | 0.5 | 0.5 |
| TOTAL | 100.0 | 100.0 |

TABLE 2

| | Time (month) | Filling 1 | Filling 2 |
|---|---|---|---|
| Cell count for | 0.1 | 8.7 | 8.7 |
| S. thermophilus | 1.0 | 8.2 | 8.8 |
| (logCFU · month$^{-1}$) | 1.5 | 7.9 | 8.9 |
| | 1.9 | 8.0 | 8.8 |
| | 3.0 | 7.7 | 8.8 |
| | 4.1 | 7.2 | 8.5 |
| Cell count for | 0.1 | 4.2 | 4.2 |
| L. bulgaricus | 1.0 | 3.5 | 4.2 |
| (logCFU · month$^{-1}$) | 1.5 | 3.4 | 3.6 |
| | 1.9 | 3.0 | 3.9 |
| | 3.0 | 1.8 | 3.9 |
| | 4.1 | 1.0 | 3.0 |

Table 3 shows decay rate for the 2 strains contained in yoghurt in the 2 fillings. L. bulgaricus is more sensitive to storage than S. thermophilus. The replacement of native wheat starch by dry starch allows improving very significantly the survival, as shown by the reduction in the decay rate.

TABLE 3

| | Filling 1 | Filling 2 |
|---|---|---|
| Decay rate (logCFU · month$^{-1}$) of S. thermophilus | 0.36 | 0.05 |
| Decay rate (logCFU · month$^{-1}$) of L. bulgaricus | 0.82 | 0.25 |
| Decay rate of total cell cultures | 0.36 | 0.05 |

Example 2

Improvement of the Survival Rates During Processing at High Temperature with Dry Starch (Vs Standard Wheat Starch)

Example 2 shows how this also leads to an improved cell count survival during processing of the fat cream at different temperatures ranging from 37° C. to 46° C.

The same filling composition as Example 1 was used. This composition was kept in a Dispermat™ mixer operating at 1500 rpm during 10 min then 200 rpm for the rest of the processing time. The double jacket was isothermally held at different temperatures for up to 24 hours, and a small quantity of filling was regularly sampled and yoghurt cultures cell count were enumerated.

Table 4 shows the decay rate for the 2 strains contained in yoghurt, in the 2 fillings and at the different temperatures.

TABLE 4

| | Temperature | Filling 1 | Filling 2 |
|---|---|---|---|
| Decay rate (logCFU · month$^{-1}$) for S. thermophilus | 37° C. | 2.5 | Not measured |
| | 40° C. | 3.7 | 2.4 |
| | 43° C. | 16.1 | Not measured |
| | 46° C. | 25.6 | 7.9 |
| Decay rate (logCFU · month$^{-1}$) for L. bulgaricus | 37° C. | 35.0 | Not measured |
| | 40° C. | 62.1 | 36.5 |
| | 43° C. | 97.9 | Not measured |
| | 46° C. | 186.4 | 72.6 |

As already observed at room temperature, L. bulgaricus is much sensitive than S. thermophilus.

For a given strain (S. thermophilus or L. bulgaricus), the decay rate shows a strong increase with processing temperature. In average, the decay rate is increased by a factor 2.6 and 16.8 respectively for S. thermophilus and L. bulgaricus per each ° C. increase.

By contrast, with the filling 2, the decay rate is only increased by a factor 0.9 and 6.0 for filling 2, showing that the use of dry starch instead of the native starch has a stabilizing effect on the survival of the live cultures. Comparing the decay rates vs temperatures for the 2 fillings, one can see that the same value is obtained with a temperature difference of about 3° C. for Filling 1 compared with Filling 2. For instance, a decay rate value of 2.5 log CFU.month$^{-1}$ is obtained for S. thermophilus with Filling 2 at 40° C. whereas it is obtained at 37° C. for Filling 1. Same situation is observed with L. bulgaricus. Since processing temperature is mainly governed by filling rheology, it follows that processing Filling 2 at 40° C. is—from the point of view of cultures survival—equivalent to processing Filling 1 at 37° C., a temperature at which the filling would be too stiff/firm to be deposited.

Example 3

Improvement of Filling Fluidity with Dry Starch (VS Standard Wheat Starch)

The same filling composition as Example 1 was used. 9 different fillings were prepared according to the process given in Example 1. The only difference was the type of starch, either obtained from wheat or corn, and with moisture content ranging from 3 to 14%. The fillings were prepared according to Example 1 and their viscosity was measured at 40° C.

Table 5 summarizes the information obtained on the different starches as well as the properties of the fillings.

| Starch (supplier) | Botanical origin | Starch moisture (%) | Starch Aw | Filling Aw | Filling viscosity |
|---|---|---|---|---|---|
| Meritena 200 (Tereos-Syral) | Wheat | 11.3 | 0.375 | 0.33 | 14.1 |
| Dry starch 5% (Roquette) | Wheat | 5.4 | 0.09 | 0.15 | 11.5 |
| Meritena 100 (Tereos-Syral) | Corn | 11.6 | 0.41 | 0.32 | 18.4 |
| C* Gel LM 3416 (Cargill) | Corn | 5.8 | 0.12 | 0.18 | 12.3 |

-continued

| Starch (supplier) | Botanical origin | Starch moisture (%) | Starch Aw | Filling Aw | Filling viscosity |
|---|---|---|---|---|---|
| C* Gel LM 3411 (Cargill) | Corn | 3.1 | 0.05 | 0.09 | 10.7 |
| Merizet 118 (Tate & Lyle) | Corn | 7.3 | 0.17 | 0.19 | 10.5 |

Example 3 shows that using a dry starch instead of a native starch decreases the Aw of the filling. Surprisingly, it also reduced filling viscosity significantly. The reduction in viscosity between the filling containing 12% moisture starch and those containing 5% moisture starch is about 18% for wheat and 33% for corn. Such a reduction in viscosity was not expected from the prior art, since US2010136182/FR2895877, comparing starch at 13% moisture vs starch at 5% moisture in fat-based fillings, does not see any benefit in using the dry starch and recommends using standard starch.

Such viscosity reduction potentially allows depositing the filling at a lower temperature, while keeping the same fluidity. The survival of live cultures is ultimately enhanced by 2 different mechanisms: the fact that filling can be deposited at a lower temperature (Example 3) and the fact that at any temperature, survival is enhanced with dry starch vs standard starch (Example 2).

Example 4

Improvement of the Survival Rates at Room Temperature During Shelf-Life with Dry Starch (Vs Standard Wheat Starch) in the Composite Product Example 4 shows how the replacement of native wheat starch with 12% moisture by a dry starch with 5% moisture allows a significant increase in live cultures survival over the shelf-life at room temperature in the final composite product.

A composite product is obtained by assembling two biscuits with a yoghurt filling. For a sandwich biscuit of 25.3 g, the weights of the different components are 18.3 g for the biscuit part and 7 g for the yoghurt filling. The different components are produced according to the following manner.

Biscuit

The biscuit is produced as described in European Patent application n. 11290279.6, "Healthy layered cookie", of the same applicant with the ingredients of Table 6.

TABLE 6

| biscuit | |
|---|---|
| Ingredients | Quantity (wt. %) |
| Flour blend | 47.9 |
| Oat flakes | 14.1 |
| Sugar blend | 15.7 |
| Vegetable fat | 10.2 |
| Others (baking powders, salt, etc.) | 12.1 |
| TOTAL | 100.0 |

The yoghurt filling are produced according to Example 1. Filling 1 contains starch at 12% moisture while filling 2 contains starch at 5% moisture.

Assembling

After baking, biscuits are cooled to a temperature of 30±3° C. The yoghurt filling at 40° C. is then deposited onto a first biscuit. A second biscuit at 30±3° C. is deposited onto the top of the filling part, this second biscuit and the first biscuit forming the biscuit part. The obtained sandwich biscuit is conveyed into a cooling tunnel. At the exit of the cooling tunnel, the sandwich biscuit is at a temperature of 21±2° C. and is immediately packaged into a sachet of aluminium foil, the sachet is then sealed.

Storage

The composite products were stored in their sealed sachet at a temperature of 20° C. After 2 months, the packs were open and the filling was separated from the biscuit and live cultures content was enumerated using the official method. The results in $\log_{10}$ cfu/g of yoghurt filling are shown in Table 7 below.

TABLE 7

| Cell count evolution | | | |
|---|---|---|---|
| Yoghurt strain | Storage time (months) | Filling of composite product 1 (logCFU/g) | Filling of composite product 2 (logCFU/g) |
| S. thermophilus | 0 | 8.6 | 8.6 |
| | 2 | 8.2 | 8.4 |
| L. bulgaricus | 0 | 4.1 | 4.1 |
| | 2 | 3.1 | 3.8 |

The Aw of the composite products was also measured. The composite product 1 had a Aw of 0.14±0.01 and the composite product 2 had a Aw of 0.08±0.01.

Surprisingly, the survival is higher in the composite product 2 than in the composite product 1. This observation goes against prior art. Indeed, the studies on the impact of Aw on the survival of yoghurt cultures have shown that the cultures survive best in a Aw range between 0.11 and 0.23. This was shown on *L. bulgaricus* by Castro et al. who concluded that the survival rate was not linearly related to Aw and that environments at Aw of 0.11 and 0.23 gave the greatest survival rates (Teixeira, P. C. Castro, M. H., Malcata, F. X. and Kirby, R. M., 1995, Survival of *Lactobacillus delbrueckii* ssp. *Bulgaricus* following spray-drying, J Dairy Sci, 78, 1025-1031). Below 0.1, the survival decreases, i.e. cultures are less stable. The reason for the accelerated rate of decay at very low Aw could be explained by the damage caused upon the removal of structural water from important cell molecules (Castro, H. P., Teixeira, P. M and Kirby, R., 1995, Storage of Lyophilized Cultures of *Lactobacillus bulgaricus* under different relative humidities and atmospheres, Appl Microbiol Biotechnol, 44, 172-176).

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for producing a composite biscuit product, the method comprising:
   forming a filling comprising a yoghurt powder and from 10 to 30 wt % of dry starch, based on the total weight of the filling, wherein the filling has an Aw of from 0.05 to 0.25 and contains live lactic cultures having a cell count of at least $10^7$ cfu/g;
   contacting the filling with one or more biscuit parts to form a composite biscuit product,
   wherein the dry starch has a water content of less than 8 wt %, and wherein the filling comprises the yoghurt powder in an amount of from 3 to 15 wt %, based on the total weight of the filling.

2. The method according to claim 1, wherein the filling has an Aw of from 0.08 and 0.2.

3. The method according to claim 1, wherein the Aw of the composite biscuit product is less than 0.2.

4. The method of forming a filling comprising yoghurt powder and from 10 to 30 wt % of dry starch, based on the total weight of the filling, where the filling has an Aw of from 0.05 to 0.25 and contains live lactic cultures having a cell count of at least $10^7$ cfu/g;

contacting the filling with one or more biscuit parts to form a composite biscuit product, wherein the dry starch has a water content of less 8 wt %, and wherein the filling comprises the yoghurt powder in an amount of from 3 to 15 wt %, based on the total weight of the filling, wherein the filling comprises less than 30 wt % fat and/or less than 50 wt % sugars.

5. The method of claim 1, wherein the filling comprises from 15 to 25 wt % of dry starch, based on the total weight of the filling.

6. The method of claim 1, wherein the starch has a moisture content of less than 6wt %.

7. The method of claim 1, wherein the live lactic cultures comprise *Lactobacillus bulgaricus* and *Streptococcus thermophilus*.

8. The method of claim 1, wherein the live lactic cultures have a cell count of at least $10^8$ cfu/g.

9. The method of claim 1, wherein the composite biscuit product has a shelf stability when stored at 20° C. of at least 6 months.

10. The method of claim 1, wherein the composite biscuit product is a sandwich biscuit comprising two biscuit parts and the filling therebetween.

11. The method of claim 1, wherein the composite biscuit product further comprises a separate water-based filling.

12. The method of claim 1, wherein the filling is formed at a temperature of from 37° C. to 46° C.

13. A composite biscuit product made by the method of claim 1.

14. A composite biscuit product comprising a biscuit part and a filling, wherein the filling comprises a powder containing live lactic cultures having a cell count of at least $10^7$ cfu/g, and from 10 to 30 wt % of dry starch based on the total weight of the filling, wherein the filling has an Aw of from 0.05 to 0.25, and the dry starch has a water content of less than 8 wt %, and the filling comprises the yoghurt powder in an amount of from 3 to 15 wt %, based on the total weight of the filling.

15. The composite biscuit product according to claim 14 having a shelf stability when stored at 20° C. of at least 6 months.

16. The composite biscuit product according to claim 14, wherein carbohydrates provide at least 60% of a calorific value of the product.

17. The composite biscuit product according to claim 14, wherein the filling contains at least 5g of slowly digestible starch per 100 g of filling.

18. The method according to claim 1, wherein the Aw of the composite biscuit product is less than 0.1.

19. The method of claim 1, wherein the starch has a moisture content of from 3 to 5 wt %.

* * * * *